(12) United States Patent
Yen et al.

(10) Patent No.: US 6,724,945 B1
(45) Date of Patent: Apr. 20, 2004

(54) CORRECTING DEFECT PIXELS IN A DIGITAL IMAGE

(75) Inventors: Jonathan Yen, San Jose, CA (US); Daniel R. Tretter, Palo Alto, CA (US); Truong-Thao Nguyen, Fort Lee, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/578,251

(22) Filed: May 24, 2000

(51) Int. Cl.[7] .................................. G06K 9/40
(52) U.S. Cl. ................. 382/274; 348/246; 382/167; 382/199; 382/260; 382/275; 382/300
(58) Field of Search ................. 382/162–167, 382/194, 197, 199, 205, 260–266, 298–300; 348/241–247

(56) References Cited

U.S. PATENT DOCUMENTS

| | | | |
|---|---|---|---|
| 4,630,307 A | 12/1986 | Cok | |
| 4,734,774 A | 3/1988 | Skaggs et al. | 358/213.15 |
| 5,144,446 A * | 9/1992 | Sudo et al. | 348/246 |
| 5,231,680 A | 7/1993 | Williams | 382/54 |
| 5,365,604 A | 11/1994 | Kwok et al. | 382/54 |
| 5,373,322 A | 12/1994 | Laroche et al. | 348/273 |
| 5,381,175 A * | 1/1995 | Sudo et al. | 348/246 |
| 5,446,501 A | 8/1995 | Takemoto et al. | |
| 5,596,367 A | 1/1997 | Hamilton, Jr. et al. | |
| 5,696,554 A | 12/1997 | Hwang | 348/246 |
| 5,805,216 A * | 9/1998 | Tabei et al. | 348/248 |
| 5,875,040 A | 2/1999 | Matraszek et al. | 358/453 |
| 5,982,946 A * | 11/1999 | Murakami | 382/272 |
| 6,104,839 A * | 8/2000 | Cok et al. | 382/254 |
| 6,185,320 B1 * | 2/2001 | Bick et al. | 382/132 |
| 6,269,181 B1 * | 7/2001 | Acharya | 382/162 |
| 6,278,803 B1 * | 8/2001 | Ohashi | 382/254 |
| 6,373,918 B1 * | 4/2002 | Wiemker et al. | 378/62 |
| 6,507,346 B1 * | 1/2003 | Otera | 345/606 |
| 6,529,239 B1 * | 3/2003 | Dyck et al. | 348/278 |
| 2002/0001409 A1 | 1/2002 | Chen et al. | |

FOREIGN PATENT DOCUMENTS

| | | | | |
|---|---|---|---|---|
| EP | 0478040 A2 | 4/1992 | | H04N/9/88 |
| EP | 0615205 A2 | 9/1994 | | G06F/15/68 |
| GB | 2120895 A | 12/1983 | | H04N/5/94 |
| GB | 2164521 A | 3/1986 | | H04N/5/94 |
| WO | WO 01/47244 | 6/2001 | | |

* cited by examiner

Primary Examiner—Bhavesh M. Mehta
Assistant Examiner—Gregory Desire

(57) ABSTRACT

Systems and methods of correcting one or more defect pixels in a source image are described. The source image is formed from a plurality of pixels each having a respective value. In one scheme, a defect pixel is corrected based upon curvature information computed from pixel values located near the defect pixel. In another scheme, a median pixel value is determined from values of pixels located near a defect pixel, and the defect pixel is corrected based upon the median pixel value.

21 Claims, 4 Drawing Sheets

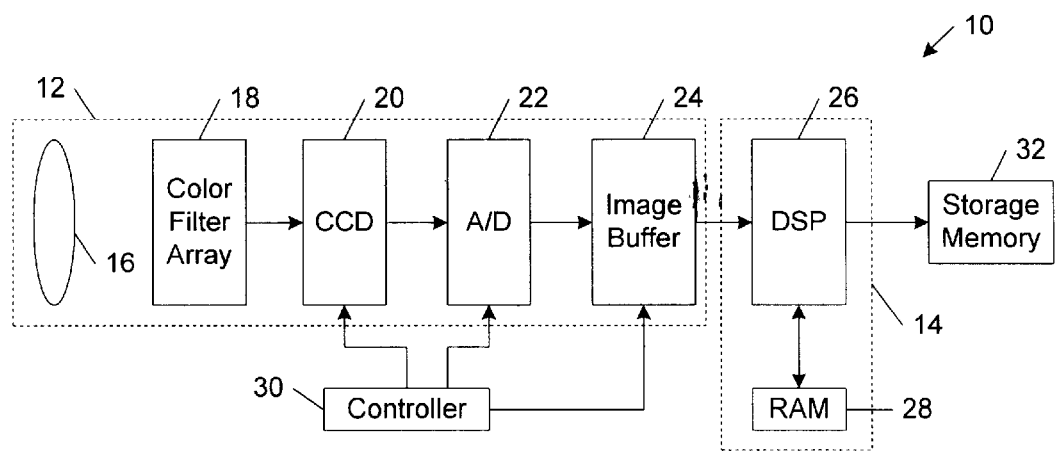
FIG. 1
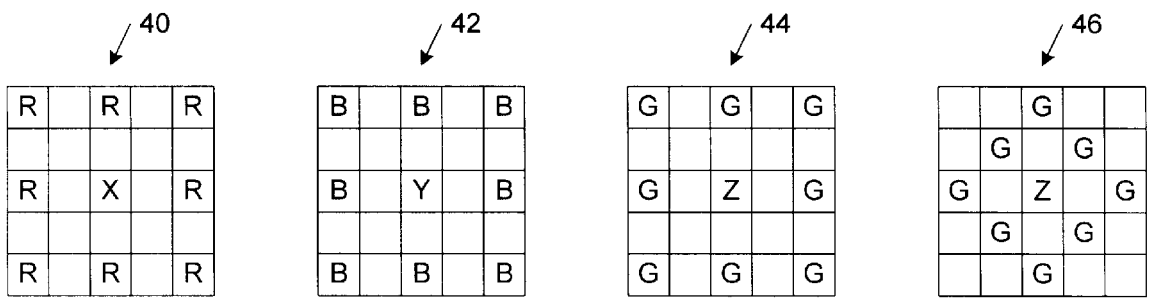
FIG. 2
FIG. 3A    FIG. 3B    FIG. 3C    FIG. 3D

CORRECTING DEFECT PIXELS IN A DIGITAL IMAGE

TECHNICAL FIELD

This invention relates to systems and methods for correcting defect pixels in a digital image (for example, a digital still image, a digital video image, or both).

BACKGROUND

Digital images are formed from an array of pixels (picture elements), each pixel having an assigned color and intensity. A digital image may be captured by a charged-coupled device (CCD) with a planar array of photodetectors. Each photodetector is located at a respective pixel position. Defective photodetectors produce imperfections in the corresponding pixel locations in the resulting digital image. Although CCD manufacturers have reduced the photodetector defect rate significantly, elimination of all defects typically is not practical. Consequently, manufacturers of digital imaging devices generally include systems designed to correct imperfections caused by photodetector defects. Various correction systems have been proposed. Some correction systems include image processors designed to interpolate the correct values of defect pixels based upon the values of non-defective neighboring pixels. Such correction systems may be classified as directional interpolation systems, or non-directional averaging (or erosion) systems. For example, in one proposed directional interpolation system, a defect pixel value is obtained by linear interpolation of a line of pixels that extends through the defect pixel and is oriented in a direction determined from gradient information derived from the pixels neighboring the defect pixel. Typical non-directional averaging systems tend to be easier to implement; however, they also tend to overly smooth non-edge image areas and significantly distort edges in the corrected image.

SUMMARY

The invention features improved systems and methods of correcting one or more defect pixels in a source image formed from a plurality of pixels each having a respective value.

In one aspect, the invention features a scheme in which a defect pixel is corrected based upon curvature information computed from pixel values located near the defect pixel.

Embodiments may include one or more of the following features.

The defect pixel preferably is corrected by interpolating values of pixels aligned with the defect pixel in an interpolation direction determined from the curvature information. The interpolation direction may be determined by comparing curvature values computed for two orthogonal directions. The interpolation direction preferably corresponds to the direction having the lower curvature value. The defect pixel preferably is assigned a value computed from a linear interpolation of values of pixels aligned with the defect pixel along the interpolation direction. The defect pixel may be assigned a value computed from a linear interpolation of values of two non-defective pixels located on opposite sides of the defect pixel. The assigned defect pixel value may be computed from the operations of adding and shifting.

The defect pixel may be corrected based upon curvature information computed for two different image directions. For example, a horizontal curvature value may be computed based upon pixel values from two groups of horizontally aligned pixels located on opposite sides of the defect pixel. A vertical curvature value may be computed based upon pixel values from two groups of vertically aligned pixels located on opposite sides of the defect pixel. Alternatively, curvature values may be computed based upon values of pixels surrounding the defect pixel. The defect pixel may be corrected based upon a comparison of the computed curvature values. For example, the defect pixel may be corrected by interpolating values of pixels aligned vertically with the defect pixel in response to a determination that the horizontal curvature exceeds the vertical curvature.

Alternatively, the defect pixel may be corrected by interpolating values of pixels aligned horizontally with the defect pixel in response to a determination that the vertical curvature exceeds the horizontal curvature.

The source image may be obtained from an image sensor having a plurality of light detectors each generating a pixel value of a respective color, wherein the colors are arranged in multiple color planes of non-overlapping pixel locations. The defect pixel may be corrected based upon curvature information computed from values of pixels in the same color plane.

In another aspect, the invention features a scheme in which a median pixel value is determined from values of pixels on the same color plane located near a defect pixel, and the defect pixel is corrected based upon the median pixel value.

Embodiments may include one or more of the following features.

The median pixel value preferably is determined from values of pixels on the same color plane adjacent to the defect pixel. A difference value representative of the difference between the defect pixel value and the computed median pixel value may be computed, and the defect pixel may be corrected by replacing the defect pixel value with the median value in response to a determination that the difference value exceeds a threshold value.

Among the advantages of the invention are the following.

The curvature-based directional interpolation invention provides a robust and efficient scheme for recovering corrupted pixel data in both low frequency (smooth) areas and high frequency (edge and corner) areas of the source image. The median filter invention, on the other hand, provides an efficient scheme for recovering corrupted pixel data on the fly, especially when the locations of defects are not known beforehand. The median filter invention effectively removes outliers (i.e., adjacent defect pixels), while substantially preserving edges and corners in the source image.

Other features and advantages of the invention will become apparent from the following description, including the drawings and the claims.

DESCRIPTION OF DRAWINGS

FIG. 1 is a block diagram of selected components of a digital imaging device.

FIG. 2 is a diagrammatic view of a pixel array with a Bayer geometry color pattern formed from non-overlapping color planes.

FIGS. 3A-3D are diagrammatic views of four pixel array color planes that may be extracted from the Bayer geometry color pattern of FIG. 2.

DETAILED DESCRIPTION

Figure 4:
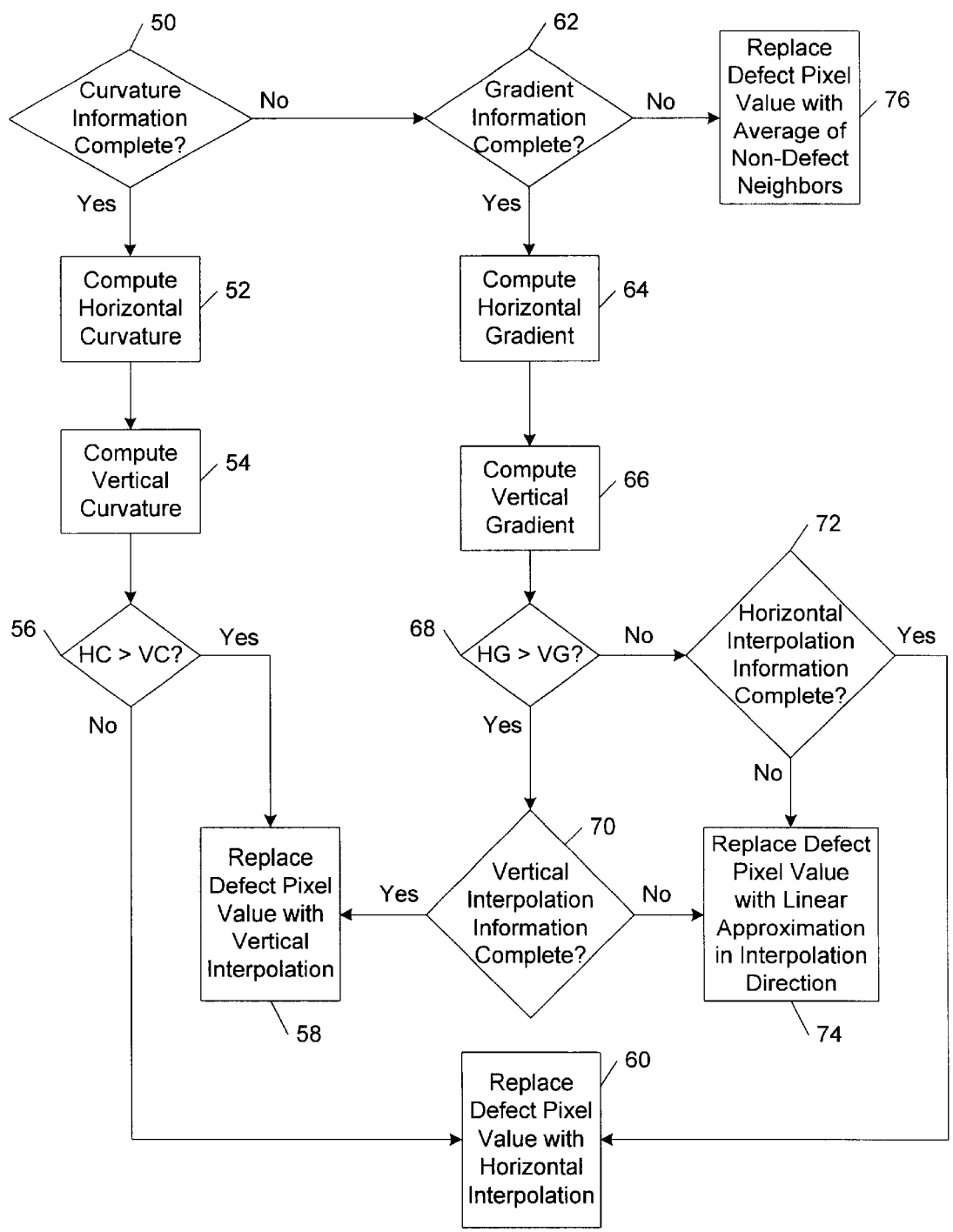
FIG. 4 is a flow diagram of a method of correcting a defect pixel in a digital source image.

Referring to FIG. 1, a digital imaging device 10 has an imaging section 12 and a correction filter section 14. Imaging section 12 includes a lens 16, a color filter array 18 (e.g., a Bayer array), a CCD 20, an analog-to-digital (A/D) converter 22, and an image buffer 24 (e.g., a random access memory). Correction filter section 14 includes a digital signal processor (DSP) 26 and a random access memory (RAM) 28. A controller 30 coordinates the operation of the components of imaging section 12 and correction filter section 14. Digital imaging device 10 may be a digital camera configured to record digital still images or a digital video recorder configured to record digital video images. Images captured by digital imaging device 10 may be recorded in a storage memory 32 (e.g., a removable memory card or a digital video cassette). In operation, image light is captured by lens 16 and directed through color filter array 18 to CCD 20. CCD 20 converts impinging filtered light into a plurality of analog image signals, and A/D converter 22 converts the analog image signals into digital image signals. The digital image signals are stored in image buffer 24 as source image data for processing. After a sufficient amount of source image data has been stored, the source image data is processed by DSP 26, which corrects one or more defect pixels in the source image to produce corrected image data. The corrected image data may be processed further (e.g., the source image may be demosaiced), and the final image data may be stored in storage memory 32.

Referring to FIG. 2, color filter array 18 is configured to transmit light of a single color to each pixel location of CCD 20. For example, in a Bayer color filter array geometry, the pixel colors are arranged in multiple color planes of non-overlapping pixel locations. When superimposed, the color planes form a pattern of chrominance colors (red and blue) interspersed among a checkerboard pattern of luminance colors (green), as shown in FIG. 2.

In the present embodiment, DSP 26 corrects defect pixels based upon information computed from the values of the nearest neighbor pixels; other embodiments, however, may incorporate into the correction process the values of pixels located farther away from the defect pixels. A defect pixel may be identified during calibration of digital imaging device 10 using known techniques (e.g., filtering and testing images produced by CCD 20). The locations of defect pixels may be stored as a defect map in RAM 28. In the present embodiment, the nearest neighbors of a particular defect pixel are the eight pixels located in the same color plane as the defect pixel. For example, as shown in FIGS. 3A and 3B, in a red color plane 40 and a blue color plane 42, the eight nearest neighbors of a defect pixel (X, Y) are spaced apart from the defect pixel by one pixel location. Referring to FIGS. 3C and 3D, two different color planes 44, 46 may be extracted from the Bayer geometry to identify the nearest neighbors of a defect pixel (Z). In color plane 44, the eight nearest neighbors are spaced apart from the defect pixel by one pixel location in every direction whereas, in color plane 46, four of the eight nearest neighbors are located adjacent to the defect pixel and the remaining neighbors are spaced apart from the defect pixel by one pixel location.

As mentioned above, in one embodiment, DSP 26 corrects defect pixel values based upon curvature information computed from pixel values located near each of the defect pixels. This approach provides a robust and efficient scheme for recovering corrupted pixel data in both low frequency (smooth) areas and high frequency (edge and corner) areas of the source image.

Referring to FIG. 4, in one embodiment, DSP 26 may correct a defect pixel in a source image as follows. If the curvature information is complete (i.e., none of the nearest neighbors is defective) (step SO), a horizontal curvature value (step 52) and a vertical curvature value (step 54) are computed. The horizontal curvature (HC) and vertical curvature (VC) values may be estimated respectively from two groups of horizontally-aligned and vertically-aligned pixels located on opposite sides of the defect pixel as follows:

$$\text{Horizontal Curvature} = |A - 2 \times B + C| + |F - 2 \times G + H| \quad (1)$$

$$\text{Vertical Curvature} = |A - 2 \times D + F| + |C - 2 \times E + H| \quad (2)$$

where, A, B, C, D, E, F, G and H correspond to the values of the eight nearest neighbor pixels of a defect pixel X, arranged in accordance with the following pixel array (i.e., A, B and C are the top neighbors, D is the left neighbor, E is the right neighbor, and F, G and H are the bottom neighbors).

Pixel Array I:
Curvature Information is Complete

| A | | B | | C |
|---|---|---|---|---|
|   |   |   |   |   |
| D |   | X |   | E |
|   |   |   |   |   |
| F |   | G |   | H |

If the horizontal curvature exceeds the vertical curvature (step 56), the defect pixel is corrected by interpolating values of pixels aligned vertically with the defect pixel (i.e., the value of X is replaced with the value of ½·(B+G)) (step 58). Otherwise, the defect pixel is corrected by interpolating values of pixels aligned horizontally with the defect pixel (i.e., the value of X is replaced with the value of ½·(D+E)) (step 60).

If the curvature information is incomplete (step 50) but the gradient information is complete (step 62), a horizontal gradient value (step 64) and a vertical gradient value (step 66) are computed. The horizontal gradient (HG) and vertical gradient (VG) values may be computed as follows:

$$\text{Horizontal Gradient} = |I - J| \quad (3)$$

$$\text{Vertical Gradient} = |I - K| \quad (4)$$

where I, J and K are arranged on different color planes in accordance with the following pixel array.

Pixel Array II:
Incomplete Curvature Information,
Complete Gradient Information

| A |   | B |   | C |
|---|---|---|---|---|
|   | I | J |   |   |
| D | K | X |   | E |
|   |   |   |   |   |
| F |   | G |   | Defect |

The values of other groups of pixels (e.g., A, B and D, or E, G and H), which are located at corner positions near the defect pixel, also may be used to compute the horizontal and vertical gradient information. If the horizontal gradient exceeds the vertical gradient (step 68) and the vertical interpolation information is complete (step 70), the defect pixel is corrected by interpolating values of pixels aligned vertically with the defect pixel (i.e., the value of X is replaced with the value of ½·(B+G)) (step 58). On the other hand, if the vertical gradient exceeds the horizontal gradient (step 68) and the horizontal interpolation information is complete (step 72), the defect pixel is corrected by interpolating values of pixels aligned horizontally with the defect pixel (i.e., the value of X is replaced with the value of ½·(D+E)) (step 60). If the information required for the horizontal or vertical interpolation is incomplete (steps 70, 72), the defect pixel value is replaced with a linear interpolation approximation in the interpolation direction (step 74). For example, if a horizontal interpolation is called for but both pixel X and pixel Y are defective, the values of pixel X and adjacent pixel Y may be recovered by linearly interpolating between pixel D and pixel L, as follows.

$$X = \tfrac{2}{3} \times D + \tfrac{1}{3} \times L \qquad (5)$$

$$Y = \tfrac{1}{3} \times D + \tfrac{2}{3} \times L \qquad (6)$$

where D and L are arranged on the same color plane in accordance with the following pixel array.

Pixel Array III:
Incomplete Curvature Information, Complete
Gradient Information, Incomplete Interpolation Information

| A | | B | | C | |
|---|---|---|---|---|---|
| | I | J | | | |
| D | K | X | | E | L |
| | | | | | |
| F | | G | | Defect | |

The system used to compute this linear interpolation approximation may be simplified by reducing the approximation to a form that may be computed by a series of adding and shifting operations. For example, equations (5) and (6) above, may be approximated by the following equations:

$$X \sim \tfrac{3}{4} \times D + \tfrac{1}{4} \times L = \tfrac{1}{2} \cdot (D + \tfrac{1}{2} \cdot (L+D)) \qquad (7)$$

$$Y \sim \tfrac{3}{4} \times L + \tfrac{1}{4} \times D = \tfrac{1}{2} \cdot (L + \tfrac{1}{2} \cdot (D+L)) \qquad (8)$$

Equations (5) and (6) may be approximated with greater accuracy by the following equations:

$$X \sim \tfrac{5}{8} \times D + \tfrac{3}{8} \times L = \tfrac{1}{2} \cdot (D + \tfrac{1}{2} \cdot (L + \tfrac{1}{2} \cdot (D+L))) \qquad (9)$$

$$Y \sim \tfrac{5}{8} \times L + \tfrac{3}{8} D = \tfrac{1}{2} \cdot (L + \tfrac{1}{2} \cdot (D + \tfrac{1}{2} \cdot (L+D))) \qquad (10)$$

In a preferred embodiment, the values of defect pixels X and Y are approximated by equations (9) and (10), respectively. However, equations (5) and (6) may be approximated with even greater accuracy by the following equations:

$$X \sim \tfrac{11}{16} \times D + \tfrac{5}{16} \times L = \tfrac{1}{2} \cdot (D + \tfrac{1}{2} \cdot (L + \tfrac{1}{2} \cdot (D + \tfrac{1}{2} \cdot (L+D)))) \qquad (11)$$

$$Y \sim \tfrac{11}{16} \times D + \tfrac{5}{16} \times L = \tfrac{1}{2} \cdot (D + \tfrac{1}{2} \cdot (L + \tfrac{1}{2} \cdot (D + \tfrac{1}{2} \cdot (D+L)))) \qquad (12)$$

The accuracy with which equations (5) and (6) are approximated may be increased still further by iteratively increasing the number of adding and shifting operations.

Figure 5:
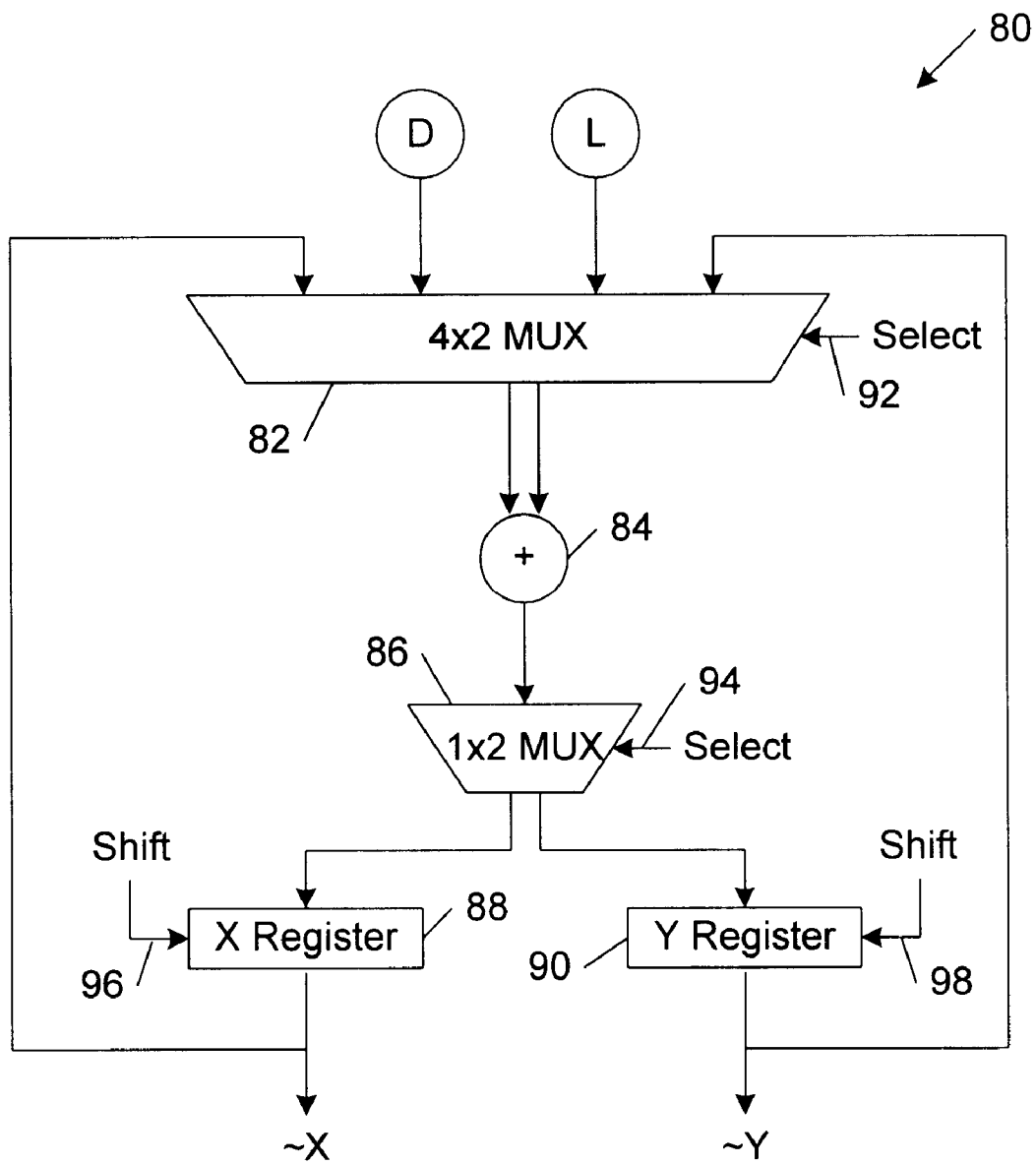
FIG. 5 is block diagram of a circuit for computing a linear interpolation approximation.

Referring to FIG. 5, each of the approximation equations (7)–(12) may be computed by an approximation circuit 80. Approximation circuit 80 includes a 4×2 multiplexer (MUX) 82, an adder 84, a 1×2 multiplexer 86, and two registers 88, 90. Multiplexer 82 has four inputs: two inputs are coupled to receive the two pixel values (D and L) from which the defect pixel values (X and Y) are to be interpolated; the remaining two inputs are coupled to receive the output values from registers 88 and 90, respectively. A select signal 92 controls which two of the four multiplexer inputs are applied to the inputs of adder 84. The output of adder 84—which represents the sum of the adder input values—is applied to the input of multiplexer 86. A select signal 94 controls which register 88, 90 receives the sum applied to the input of multiplexer 86.

In operation, controller 30 may choreograph the operation of approximation circuit 80 as follows. First, through select signal 92, controller 30 directs multiplexer 82 to apply inputs D and L to the inputs of adder 84. The resulting sum (L+D) is applied to register 90. Through shift signal 98, controller 30 shifts the contents of register 90 by one decimal place to produce the quantity ½·(L+D). The quantity in register 90 is applied to the input of multiplexer 82. In the next cycle, controller 30 directs multiplexer 82 to apply inputs D and the quantity of register 90 to the inputs of adder 84. The resulting sum (D+½·(L+D)) is applied to register 88 and, through shift signal 96, controller 30 shifts the contents of register 88 by one decimal place to produce the sum (½·(D+½·(L+D))), which corresponds to the first approximation of the interpolation of defect pixel X (i.e., equation (7)). In the following cycle, the quantity of register 90 and input L are applied to the inputs of adder 84. The resulting sum (L+½·(D+L)) is applied to register 90. Controller 30 shifts the contents of register 90 by one decimal place to produce the quantity (½·(L+½·(D+L))), which corresponds to the first approximation of the interpolation of defect pixel Y (i.e., equation (8)). The interpolation approximations of equations (9) and (10) may be computed by further cycling of approximation circuit 80. For example, the sum of input D and the contents of register 90 may be applied to register 88, and the contents of register 88 may be shifted by one decimal place to produce the quantity (½·(D+½·(L+½·(D+L)))) (i.e., equation (9)). In addition, the sum of input L and the contents of register 88 may be applied to register 90, and the contents of register 90 may be shifted by one decimal place to produce the quantity (½·(L+½·(D+½·(L+D)))) (i.e., equation (10)). Further cycling of circuit 80 in a similar manner would increase the accuracy with which the linear interpolations for X and Y may be approximated.

Referring back to FIG. 4, if both the curvature information (step 50) and the gradient information (step 62) are incomplete, the defect pixel value (X) is replaced with the average value computed from the values of the non-defective nearest neighbors (step 76):

$$X = (P_1 + P_2 + \ldots + P_N)/N \qquad (13)$$

where N is the number of non-defective nearest neighbors, and $P_1$ are the values of the non-defective nearest neighbors. In one embodiment, pixels are processed in raster scan order. Consequently, in this embodiment, pixels above and to the left of the current defect pixel (X) are guaranteed to have valid values and equation (13) will produce a valid estimate of the defect pixel value.

In another embodiment, DSP 26 corrects defect pixel values based upon a median pixel value computed from pixel values located near each of the defect pixels. This median filter approach provides an efficient scheme for recovering corrupted pixel data on the fly, especially when the locations of defects are not known beforehand (i.e., a defect map is not stored in memory 28). This approach effectively removes outliers (i.e., adjacent defect pixels), while substantially preserving edges and corners in the source image.

Figure 6:
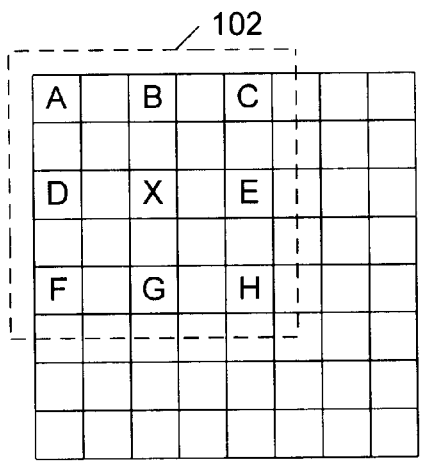
FIG. 6 is a diagrammatic view of a median filter window superimposed on a pixel array.
Figure 7:
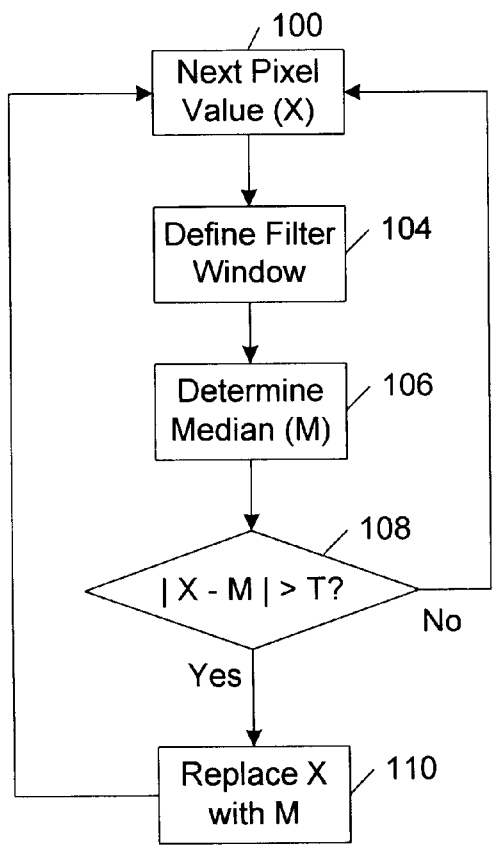
FIG. 7 is a flow diagram of a method of correcting a defect pixel in a digital source image.

Referring to FIGS. 6 and 7, DSP 26 may be configured to implement a median filter as follows. For each pixel value (X) (step 100), a median filter window 102 is defined (step 104). In this embodiment, defect pixels are corrected based upon information computed from the values of the nearest neighbor pixels; other embodiments, however, may incorporate into the correction process the values of pixels located farther away from the defect pixels. In this embodiment, the nearest neighbors of a particular pixel are the eight pixels (A, B, C, D, E, F, G and H) located in the same color plane as the pixel. The median value (M) of the values of the nearest neighbor pixels is determined (step 106). An eight-input sorting (or ordering) circuit may be used to determine the median value of the nearest neighbor pixels with the median filter window 102. If the difference between the pixel value (X) and the median value (M) is greater than a threshold value (T) (step 108), the value of pixel X is replaced with the median value (step 110). Otherwise, the value of pixel X is unchanged, and the next pixel is processed (step 100).

The systems and methods described herein are not limited to any particular hardware or software configuration, but rather they may be implemented in any computing or processing environment. Controller 30 preferably is implemented in firmware. Alternatively, however, controller 30 may be implemented in a high level procedural or object oriented programming language, or in assembly or machine language; in any case, the programming language may be a compiled or interpreted language.

Other embodiments are within the scope of the claims.

For example, although horizontal and vertical directions were selected as the primary processing directions (i.e., the directions used to determine the orientation of predominate image structure and to interpolate values for defect pixels), other processing directions (e.g., diagonal or radial image directions), including two or more directions, may be selected.

In another embodiment, horizontal and vertical curvatures may be estimated by incorporating a filter array that includes three-by-three, horizontal curvature and vertical curvature filter arrays with the following coefficient values:

Filter Array I:
Horizontal Curvature Filter Array

| ¼ | -1 | ¼ |
|---|----|---|
| ½ | 0  | ½ |
| ¼ | -1 | ¼ |

Filter Array II:
Vertical Curvature Filter Array

| ¼  | ½ | ¼  |
|----|---|----|
| -1 | 0 | -1 |
| ¼  | ½ | ¼  |

By applying filter array I and filter array II to pixel array I (above), the following horizontal and vertical curvature estimates may be obtained:

$$\text{Horizontal Curvature} = \tfrac{1}{4} \cdot (A + 4 \cdot B + C + 2 \cdot D + 2 \cdot E + F - 4 \cdot G + H) \quad (14)$$

$$\text{Vertical Curvature} = \tfrac{1}{4} \cdot (A + 2 \cdot B + C + 4 \cdot D + 4 \cdot E + F - 2 \cdot G + H) \quad (15)$$

Thus, in this embodiment, curvature values are estimated based upon the values of pixels surrounding the defect pixel.

Still other embodiments are within the scope of the claims.

What is claimed is:

1. A method of correcting one or more defect pixels in a source image formed from a plurality of pixels each having a respective value, comprising:

(a) in response to a determination that curvature information is complete, replacing a defect pixel with a value computed from pixel values located near the defect pixel along a direction selected based upon a comparison of curvature values computed along multiple different directions;

(b) in response to a determination that curvature information is incomplete and gradient information is complete, replacing the defect pixel with a value computed from values of pixels positioned near the defect pixel along a direction selected based upon a comparison of gradient values computed along multiple different directions; and (c) in response to a determination that curvature information and gradient information are incomplete, replacing the defect pixel with an average of values of non-defect pixels neighboring the defect pixel.

2. The method of claim 1, further comprising computing a horizontal curvature value based upon pixel values from two groups of horizontally aligned pixels located on opposite sides of the defect pixel.

3. The method of claim 2, further comprising computing a vertical curvature value based upon pixel values from two groups of vertically aligned pixels located on opposite sides of the defect pixel.

4. The method of claim 3, wherein in response to a determination that curvature information is complete, step (a) comprises replacing the defect pixel with a value computed based upon a comparison of the computed horizontal and vertical curvature values.

5. The method of claim 4, wherein step (a) comprises replacing the defect pixel with an interpolation of values of pixels aligned vertically with the defect pixel in response to a determination that the horizontal curvature exceeds the vertical curvature.

6. The method of claim 4, wherein step (a) comprises replacing the defect pixel with an interpolation of values of pixels aligned horizontally with the defect pixel in response to a determination that the vertical curvature exceeds the horizontal curvature.

7. The method of claim 1, further comprising computing a curvature value based upon values of pixels surrounding the defect pixel.

8. The method of claim 1, wherein step (a) comprises replacing the defect pixel with an interpolation of values of pixels aligned with the defect pixel along the selected direction determined from the curvature information.

9. The method of claim 8, wherein in step (a) the selected direction is determined by comparing curvature values computed for two orthogonal directions.

10. The method of claim 8, wherein in step (a) the defect pixel is replaced with a value computed from a linear interpolation of values of pixels aligned with the defect pixel along the selected direction.

11. The method of claim 10, wherein in step (a) the defect pixel is replaced with a value computed from a linear interpolation of values of two non-defective pixels located on opposite sides of the defect pixel.

12. The method of claim 11, wherein in step (a) the defect pixel is replaced with a value computed with only operations of adding and shifting.

13. The method of claim 1, further comprising obtaining the source image from an image sensor having a plurality of light detectors each generating a pixel value of a respective color, wherein the colors are arranged in multiple color planes of non-overlapping pixel locations, and the defect pixel is corrected based upon curvature information computed from values of pixels in the same color plane.

14. The method of claim 1, wherein in response to a determination that interpolation information along the selected direction is complete, step (b) further comprises replacing the defect pixel with an interpolation of pixel values along the selected direction.

15. The method of claim 1, wherein in response to a determination that interpolation information along the selected direction is incomplete, step (b) further comprises correcting one or more neighboring defect pixels with respective interpolated values, and replacing the defect pixel with a linear interpolation approximation along the selected direction based at least in part upon the corrected neighboring defect pixels.

16. A system, comprising a correction filter configured to:
(a) in response to a determination that curvature information is complete, replace a defect pixel with a value computed from pixel values located near the defect pixel along a direction selected based upon a comparison of curvature values computed along multiple different directions;
(b) in response to a determination that curvature information is incomplete and gradient information is complete, replace the defect pixel with a value computed from values of pixels positioned near the defect pixel along a direction selected based upon a comparison of gradient values computed along multiple different directions; and
(c) in response to a determination that curvature information and gradient information are incomplete, replace the defect pixel with an average of values of non-defect pixels neighboring the defect pixel correct a defect pixel.

17. The system of claim 16, wherein in response to a determination that curvature information is complete, the defect pixel is replaced with an interpolation of values of pixels aligned with the defect pixel along the selected direction determined from the curvature information.

18. The system of claim 17, wherein in response to a determination that curvature information is complete, the selected direction is determined by comparing curvature values computed for two orthogonal directions.

19. The system of claim 17, wherein in response to a determination that curvature information is complete, the defect pixel is replaced with a value computed from a linear interpolation of values of pixels aligned with the defect pixel along the selected direction.

20. The system of claim 19, wherein in response to a determination that curvature information is complete, the defect pixel is replaced with a value computed from a linear interpolation of values of two non-defective pixels located on opposite sides of the defect pixel.

21. The system of claim 20, wherein in response to a determination that curvature information is complete, the defect pixel is replaced with a value computed with only operations of adding and shifting.

* * * * *